US005290621A

United States Patent [19]

Bach et al.

[11] Patent Number: 5,290,621

[45] Date of Patent: Mar. 1, 1994

[54] FLAT-TOPPED WAVE-BOARD PANEL

[75] Inventors: Lars Bach; Eduard Stark, both of Edmonton, Canada

[73] Assignee: Her Majesty the Queen in right of Canada as represented by the Minister of Forestry, Hull, Canada

[21] Appl. No.: 984,971

[22] Filed: Dec. 3, 1992

Related U.S. Application Data

[63] Continuation-in-part of Ser. No. 592,252, Oct. 3, 1990, abandoned.

[51] Int. Cl.[5] .............................................. B32B 21/04

[52] U.S. Cl. .................................... 428/176; 428/174; 428/182; 428/219; 428/220; 428/326; 428/537.1; 428/541; 52/795; 52/814

[58] Field of Search ...................... 428/182, 537.1, 541, 428/176, 106, 107, 219, 220, 326; 52/795, 814

[56] References Cited

U.S. PATENT DOCUMENTS

| | | | |
|---|---|---|---|
| 3,575,768 | 4/1971 | Hannum | 156/459 |
| 4,150,186 | 4/1979 | Kazama | 428/182 X |
| 4,429,012 | 1/1984 | Danko | 428/182 X |
| 4,610,900 | 9/1986 | Nishibori | 428/326 X |
| 4,904,517 | 2/1990 | Lau et al. | 428/537.1 |
| 5,047,280 | 9/1991 | Bach | 428/182 |

FOREIGN PATENT DOCUMENTS 2628670 1/1977 Fed. Rep. of Germany ...... 428/182

OTHER PUBLICATIONS

Prefabrication; p. 43; Nov. 1953.

*Primary Examiner*—George F. Lesmes
*Assistant Examiner*—Terrel Morris
*Attorney, Agent, or Firm*—Dressler, Goldsmith, Shore & Milnamow, Ltd.

[57] ABSTRACT

A flat-peaked and flat-troughed corrugated wafer board panel is provided. The panel is characterized in having a substantially uniform density.

8 Claims, 7 Drawing Sheets

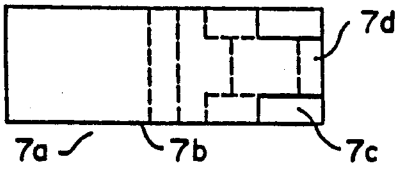
FIG. 8
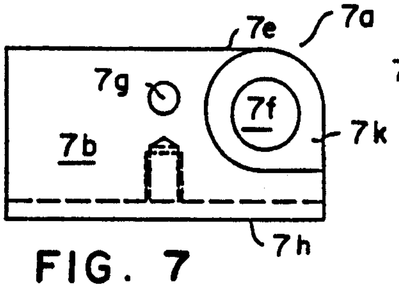
FIG. 7
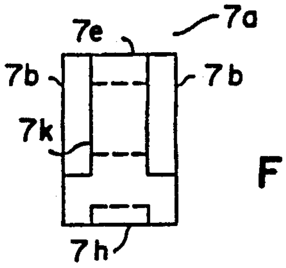
FIG. 9
FIG. 12
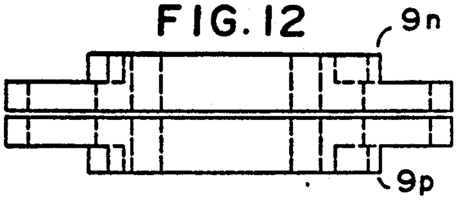
FIG. 14
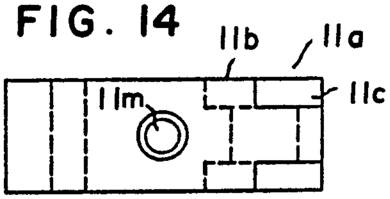
FIG. 11
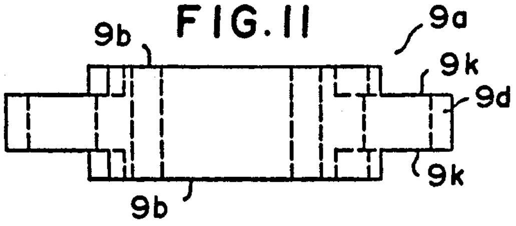
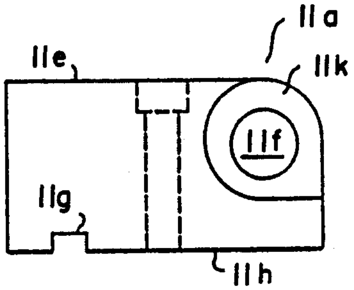
FIG. 13
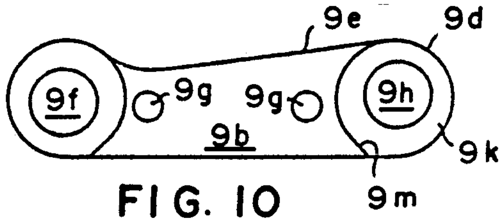
FIG. 10
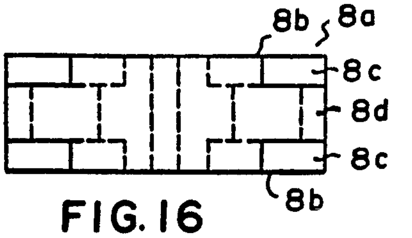
FIG. 16
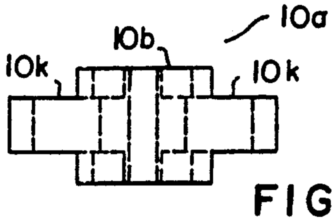
FIG. 18
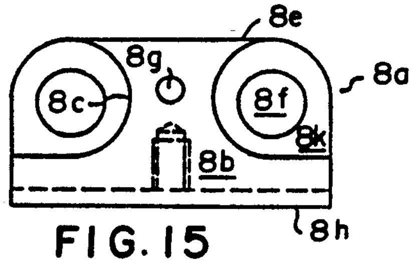
FIG. 15
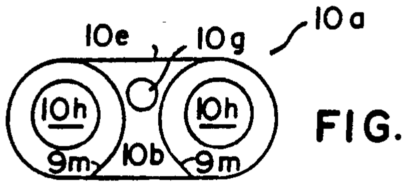
FIG. 17

FLAT-TOPPED WAVE-BOARD PANEL

This is a continuation-in-part application of Ser. No. 07/592,252 filed on Oct. 3, 1990, now abandoned.

FILED OF THE INVENTION

The present invention relates to a flat-peaked and flat-troughed corrugated wafer board panel.

BACKGROUND OF THE INVENTION

Typically, a wafer board panel comprises layers of wood flakes or wafers formed into a composite structure using a resinous binder. The preparation of wafer board panels is complex, but broadly consists of two principal stages. The first stage comprises the preparation of the wafers and the admixing thereof to form a loose layer or mat; the second stage involves subsequent compression and heating of the mat to cure the resin and form the consolidated panel.

Until recently, wafer board was manufactured in the form of planar or flat sheets. However, as disclosed in U.S. Pat. No. 4,616,991, the present applicant has developed an apparatus and process for the manufacture of panels having a wave-like or corrugated configuration. Such wave-board panels have improved structural strength properties, relative to planar panels.

This prior patented apparatus involved a pair of opposed, spaced-apart, upper and lower platens. Each platen was formed of adjacent lengths of chain-like links. When the lengths were pushed inwardly from the side, they would shift from a planar to an undulating corrugated form.

The process steps involved:

distributing a mat of loose wood wafers between the upper and lower platen surfaces while they are maintained in the planar configuration;

biasing the platens together to pre-compress the mat, and thereby substantially fixing the wafers together to limit their further relative movement;

converting the two platen surfaces, still in pressing association with the mat, from the planar to the corrugated configuration; and then applying additional pressure and heat for a sufficient time to cure the binder and produce a corrugated wave-board panel.

The main advantage inherent in the patented process was that the panel product so formed was characterized by having a substantially uniform density. This was achieved because the wafers were fixed by the pre-compression step and because the mat was not significantly stretched or elongated during the conversion from the planar to the corrugated configuration.

It will be also noted that the panel product formed using the particular mechanical assembly described hereabove is limited to a sinusoidal configuration. The peaks and troughs of the panel have a generally rounded profile.

Certain applications of corrugated wave-board may involve the attachment of a corrugated wave-board web to either a single or two planar stressed-skin panels. Usually, the separate pieces are secured together by means of adhesives or by fastening elements. However, because of the limited contact area between the rounded peaks and troughs of the wave-board and the adjacent skins, it is often difficult to secure the separate pieces together with any stability.

In order to overcome this limitation, applicants contemplated the provision of a wave-board characterized by a flat-topped (or flat-peaked) and a flat-bottomed (or flat-troughed) profile. This change would increase the available attachment area between components and thus provide improved stability. Starting from this concept a particularly configured wave-board and a press platen assembly for manufacturing the wave-board has been developed.

Turning now to prior art patents. Nishibori, in U.S. Pat. No. 4,610,900 teaches a wood-like molded product of synthetic resin prepared by mixing a synthetic thermoplastic resin with a fine aggregate of cellulose base. The resin comprises the bulk of the product rather than the cellulose. The product is then subjected to a sanding or jetting treatment on its surface hardened layer.

SUMMARY OF THE INVENTION

Applicants initially attempted to modify the link-array system described in the previously mentioned '991 patent. More specifically, an additional row of flat-topped link elements was interposed between and pivotally connected to the angled link rows, at their apexes. However, when this arrangement was tried it was found that, because of the differing frictional forces existing between the various link rows it was not possible to obtain a uniformly aligned wave configuration.

It was then discovered that, in order to attain configurational stability for this particular system it is essential to provide means for locking the angled main link rows, having the flat-topped connecting link elements therebetween, in the desired configuration. Stated otherwise, it is necessary to limit the angular rotation of the angled main link rows when the laterally-directed biasing force is applied to the platen system.

Preferably such locking means would comprise stops associated with each side of the connecting flat-topped link elements which stops cooperate with the angled main links so as to function in a hinge-like manner.

As a result of this provision it is possible to convert the links from the planar position to the flat-topped position. The flat-topped panel prepared by the apparatus of the present invention is advantageously characterized by exhibiting improved strength and bending properties which inherently accompany this particular configuration.

Broadly stated, the invention is a platen assembly, for use in forming flat-topped wave-board panels, comprising: first means for forming a planar support surface; parallel, spaced apart, elongate end members forming inner working faces that are generally perpendicular to the support surface, at least one of said end members being movable toward the other along the support surface while remaining parallel thereto; a plurality of elongate link elements positioned on the support surface in spaced relationship, between the end members, said elements being slidable along the surface in parallel relationship, said link elements forming a generally planar upper surface; first and second opposed pivoting link elements, said link elements each being pivotally connected at one end to an adjacent link element whereby the pair of first and second pivoting elements extend between a pair of link elements; connecting link elements forming a generally planar upper surface, said connecting link elements each being pivotally connected between a pair of first and second pivoting link elements, whereby the connecting link elements maintain the pivoting link elements connected thereto in spaced apart relationship; means associated with each pair of pivoting link elements and their associated connecting link element, for releasably limiting the pivoting elements to a generally inverted v-shaped configuration, with said connecting link elements lying in a horizontal plane therebetween, when the end members are biased together; and means for moving the end members together and apart to convert the link elements between the corrugated and planar forms.

In a second broad aspect, there is provided a waveboard panel which comprises a board formed of a mat of thermosetting resin and wax admixed with wafers having a length ranging from about 1" to 12", a thickness ranging from 0.02" to 0.06", a width ranging from 0.2" to 2" and a resin content ranging from about 1% to about 6% wherein said mat has been converted from the planar to a wave configuration and subjected to binder curing and compression, said board having a flat-peaked and a flat-troughed profile, and said board further having an essentially uniform density throughout.

DESCRIPTION OF THE DRAWINGS

FIGS. 7, 8, and 9 are side views, plan views and end views respectively of an end link;

FIGS. 10, 11, and 12 are side views, end views and plan views respectively of a main link.

FIGS. 13 and 14 are side views and plan views respectively of a stationary link;

FIGS. 15 and 16 are side views and plan views respectively of a sliding link;

FIGS. 17 and 18 are side views and plan views respectively of a connecting link;

DESCRIPTION OF THE PREFERRED EMBODIMENT

Figure 1:
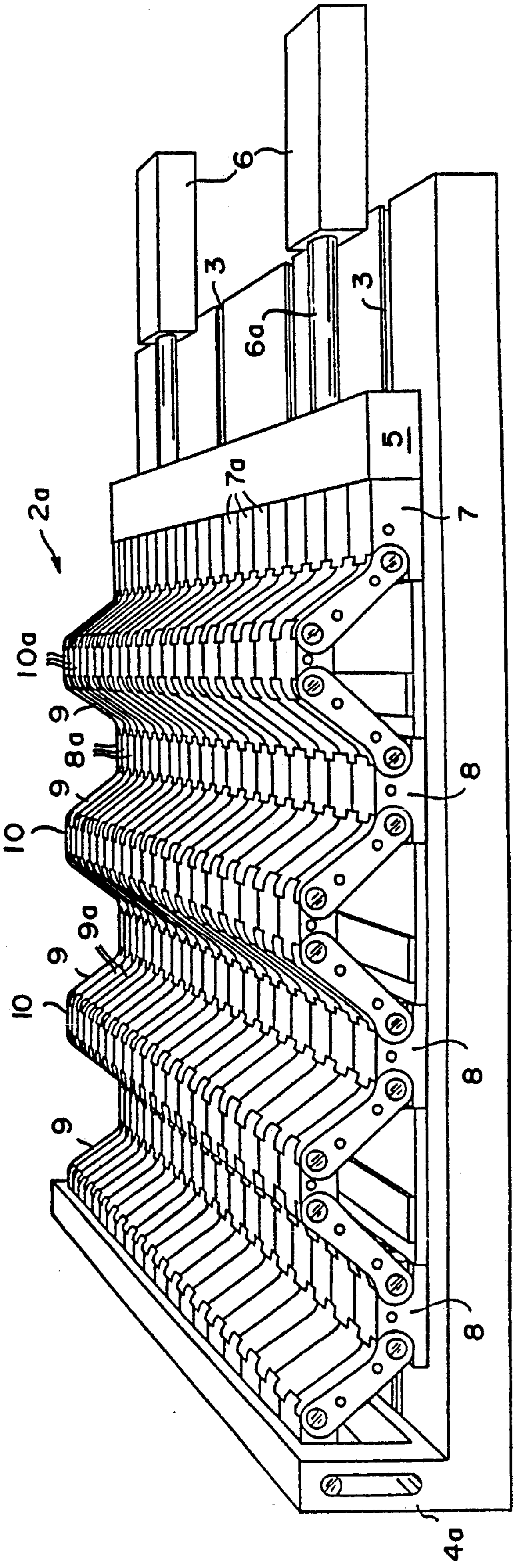
FIG. 1 is a perspective view showing a lower platen assembly in accordance with the invention with the links in the corrugated position.
Figure 2:
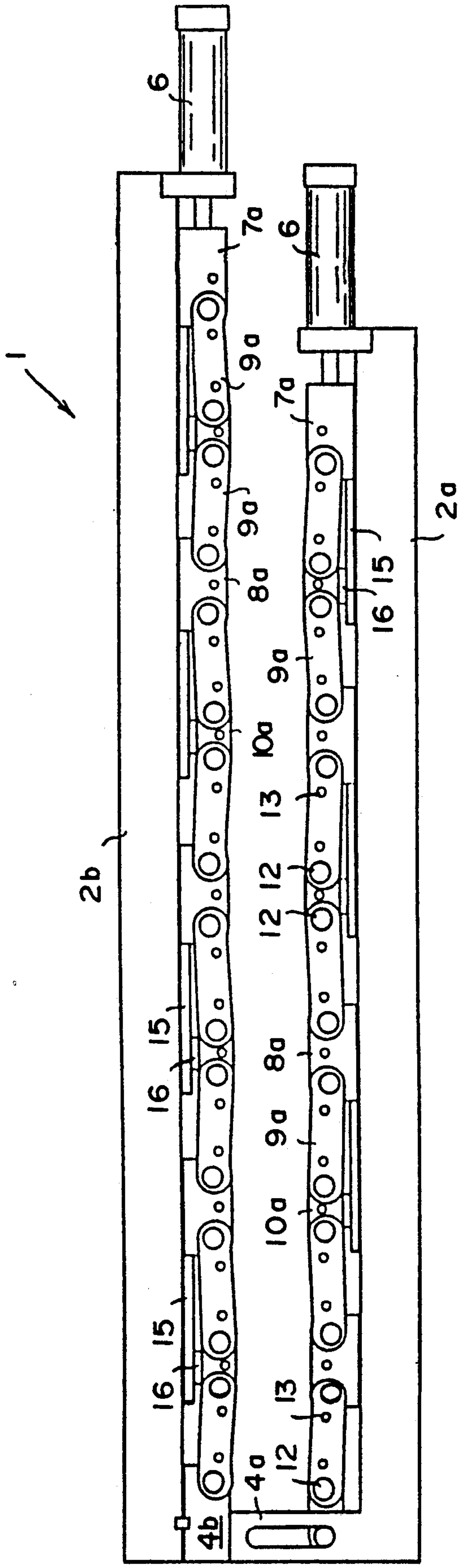
FIG. 2 is a side view showing the upper and lower platen assemblies in the generally planar configuration.

Having reference to the accompanying drawings, there is shown a platen assembly 1, which includes a base plate 2.

Four elongate key-ways are cut in the upper face of the lower and upper base plates 2*a* and 2*b* respectively. The key-ways are parallel and extend longitudinally the length of the base plate 2, at spaced points across its width.

An elongate stop member 4*a* is affixed to the base plate 2*a* along one edge thereof and extends transversely thereacross.

A second elongate stop member 4*b* is similarly affixed to the base plate 2*b*.

An elongate biasing member 5 is positioned on each of the base plates 2 along its other edge in opposed relation to the stop members 4. The biasing member 5 has downwardly extending keys (not shown) for engaging the key-ways 3. Thus the transversely extending biasing member 5 is slidable along the base plate 2 toward the stop member 4. The walls of the key-ways 3 are operative to maintain the biasing member 5 parallel to the stop member 4.

The stop member 4 and biasing member 5 form end members for the platen to be described hereinafter.

A pair of double-acting hydraulic cylinders 6 are secured to the base plate 2 at one end thereof in spaced apart relationship. The cylinders 6 extend longitudinally parallel to the main axis of the base plate 2. The pistons 6*a* of the cylinders 6 are secured to the biasing member 5. Extension or contraction of the cylinders 6 serves to advance or retract the biasing member 5, along the key-ways 3, toward or away from the stop member 4 and parallel thereto.

Secured to the biasing member 5 is a row 7 comprised of side-by-side end links 7*a*.

As shown in FIGS. 7, 8, and 9 each end link 7*a* comprises an elongate generally rectangular block 7*b* having on one of its upper corners a pair of generally circular cut away sections 7*c* leaving a central tongue 7*d* therebetween. A generally circular bore 7*f* extends through the central tongue 7*d*. A second circular bore 7*g* is further defined in the block 7*b* for reasons to be described later. A key 7*h* extends downwardly for engaging the key-ways 3.

Spaced apart link rows 8 extend transversely across the base plate 2 parallel to the end link row 7, stop members 4 and biasing members 5.

Each row 8 is comprised of discreet sliding link members 8*a* positioned in side-by-side relationship. It will be noted that the upper working face 8*e* of each sliding link 8*a* is flat so as to impart a planar flat top to the troughs 19 of the panel 17.

As detailed in FIGS. 15 and 16, each sliding link 8*a* comprises a generally rectangular block 8*b* having each of its four upper corners cut away in a generally circular fashion to form grooves 8*c*. Thus there are left two central segments 8*d*, one between each pair of grooves 8*c* on either side of block 8*b*. Each central segment 8*d* forms a transverse bore 8*e* and 8*f* respectively. A further bore 8*g* extends transversely through the upper portion of the block 8*b*. The functions of the sliding link 8*a*, its grooves 8*c* and bores 8*e* and 8*f* respectively will be described below. Each link 8*a* forms a downwardly extending key 8*h* for engaging the key-ways 3.

Thus the sliding links 8*a* in each row 8 abut one another in closely positioned consolidated formation. Each row 8 comprising a link element 8*a* is slidable as a unit along the length of the base plate 2.

A first row of main links 9, is pivotally connected on one side thereof to the row 7 of end links and on the other to a first row of connecting links 10.

An identical row of main links 9 is similarly pivotally connected on one side to the first row of connecting links 10 and on its other to the row of sliding links 8.

Subsequent rows of main links 9 are alternatively pivotally connected to sliding links 8 and connecting links 10 as illustrated.

Thus the rows of links 9 comprise the first and second opposed pivoting link elements.

Each link row 9 is formed of an array of side-by-side individual main links 9a which dovetail at each end with the sliding links 8 and connecting links 10.

As shown in FIGS. 10, 11, 12 and 19 each main link 9a comprises an elongate generally rectangular block 9b. A pair of generally circular grooves 9c are cut away on each of its outer ends leaving generally circular tongues 9d herebetween. Generally circular bores 9f and 9h respectively are formed in each of the tongue portions 9d. A second pair of bores 9g are formed in the block 9b for reasons to be described hereinafter.

A row 10 of connecting links 10a is positioned between each row 9 of opposed main links 9a and pivotally connected thereto by means of rods 12.

Figure 19:
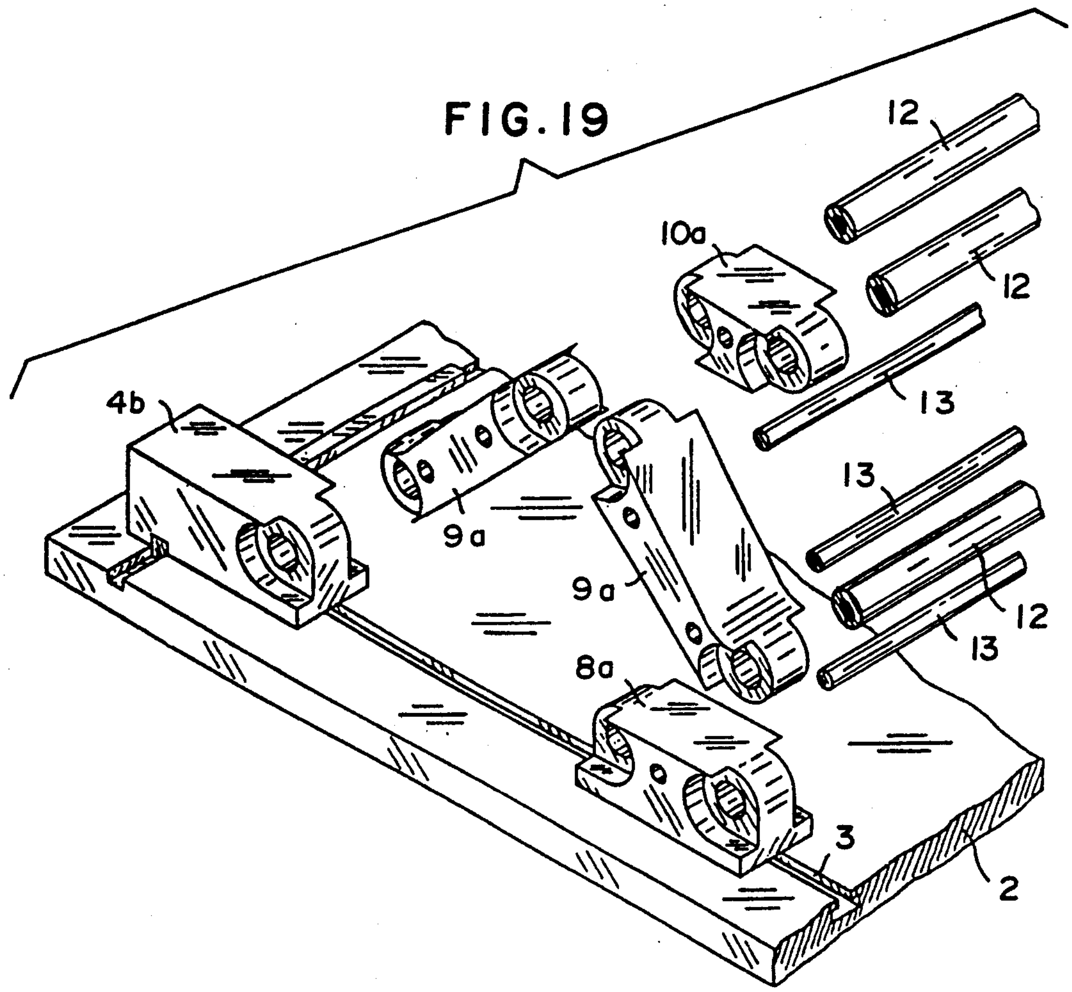
FIG. 19 is an exploded view of the link elements making up the assembly.
Figure 20:
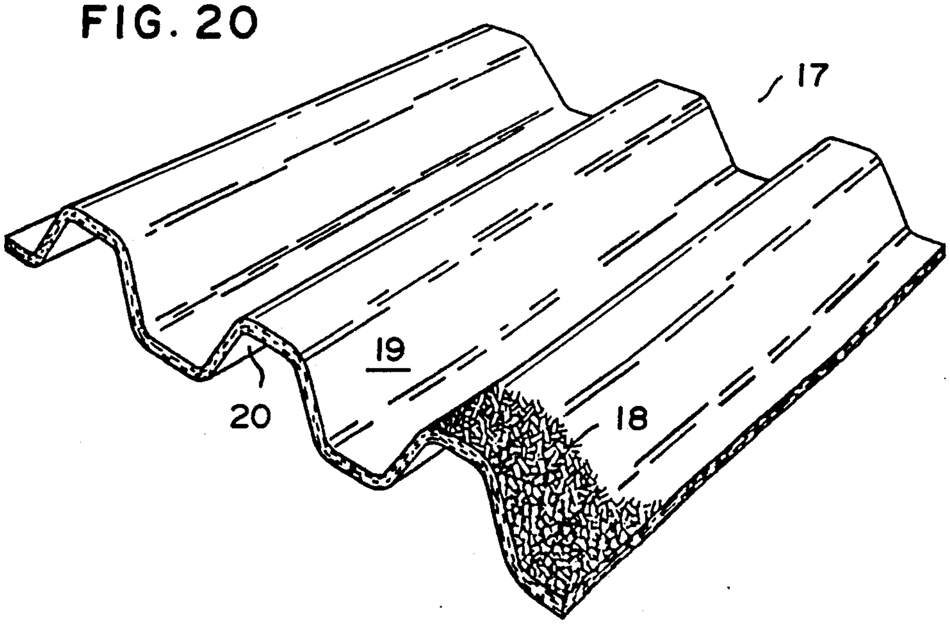
FIG. 20 is a perspective view of the flat-topped wafer-board panel product.

As shown in FIGS. 17, 18 and 19 each connecting link 10a comprises a generally L-shaped block 10b having planar upper and lower surfaces 10e. Each of the link 10a's upper corners are cut away in a generally circular fashion to form arcuate grooves 10c. Thus are left two upper and lower central tongue segments 10d. Circular bores 10h are provided in segments 10d. A central bore 10g is further formed in the central portion 10b for reasons to be described hereinafter.

In assembly, therefore, the faces 8k and 9k of the individual links 8a and 9b are brought into abutting engagement one with another. The rods 12 extend through their aligned bores 8f and 9f respectively. Similarly, the faces 9k and 10k of the links 9a and 10a respectively are contiguous with the rod 12 extending through their aligned bores 9h and 10h respectively.

It will be noted that the arrangement of alternating tongue's grooves 9c and tongues 9d on the main links 9 and alternating grooves 10c and tongues 10d formed on the connecting links 10 function to limit the angular rotation of the pivotally interconnected links 9 and 10, operating in a hinge-like manner. In the locked position the opposed pivoting main links are fixed into a generally inverted v-shape. Thus, when the biasing force is applied to the sliding elements 8a, the sliding link rows 8 will pivot only to the extent that the top connecting link rows 10 lie in a generally horizontal plane. As a result of this arrangement, stop means are provided for releasably limiting the pivoting elements to a generally inverted v-shaped configuration with said connecting link elements lying in a horizontal plane therebetween.

Adjacent the stop member 4 is a row 11 of side by side end links 11a. Each end link 11a which is of a generally rectangular shape forms a block 11b. At its outer end the side is cut away in a generally circular fashion to form grooves 11c. Thus is left a central segment 11d which forms a circular bore 11f.

Transversely extending across the lower plate 2a are provided spacers 15. Also provided on the base plate 2a and associated with said spacers 15 are lifters 16 which function to guide the directional movement of the main links 9 and connecting links 10.

The mechanical assembly is characterized by the following:

the sliding link rows are fixed to the base plate by the key and keyway interconnections—they can travel along the length of the base plate toward each other in parallel formation but their elevation remains constant;

when the lateral biasing force is applied initially, the pivoting main link rows move upwardly, only to a predetermined position. The top connecting link row, which at this point is lying at an inclined angle, falls back into a planar position as the biasing force is continued and the opposed pivoting row is rotated only to a predetermined extent whereupon the top connecting link row is locked in the horizontal plane by the provision of the aforementioned stop means.

Stated otherwise, the first and second opposed pivoting link elements, sliding link elements and connecting link elements having locking means associated therewith cooperate to provide a substantially non-porous platen whose surface configuration is mechanically convertible between a substantially planar form and a corrugated form wherein the peaks and troughs of the corrugations are characterized by being of a generally flat or planar profile.

Heating means are supplied to heat the platen 1. Such means are provided by electrical heating rods 13 which extend through the bores 8g, 9g and 10g respectively as described hereabove.

Figure 21:
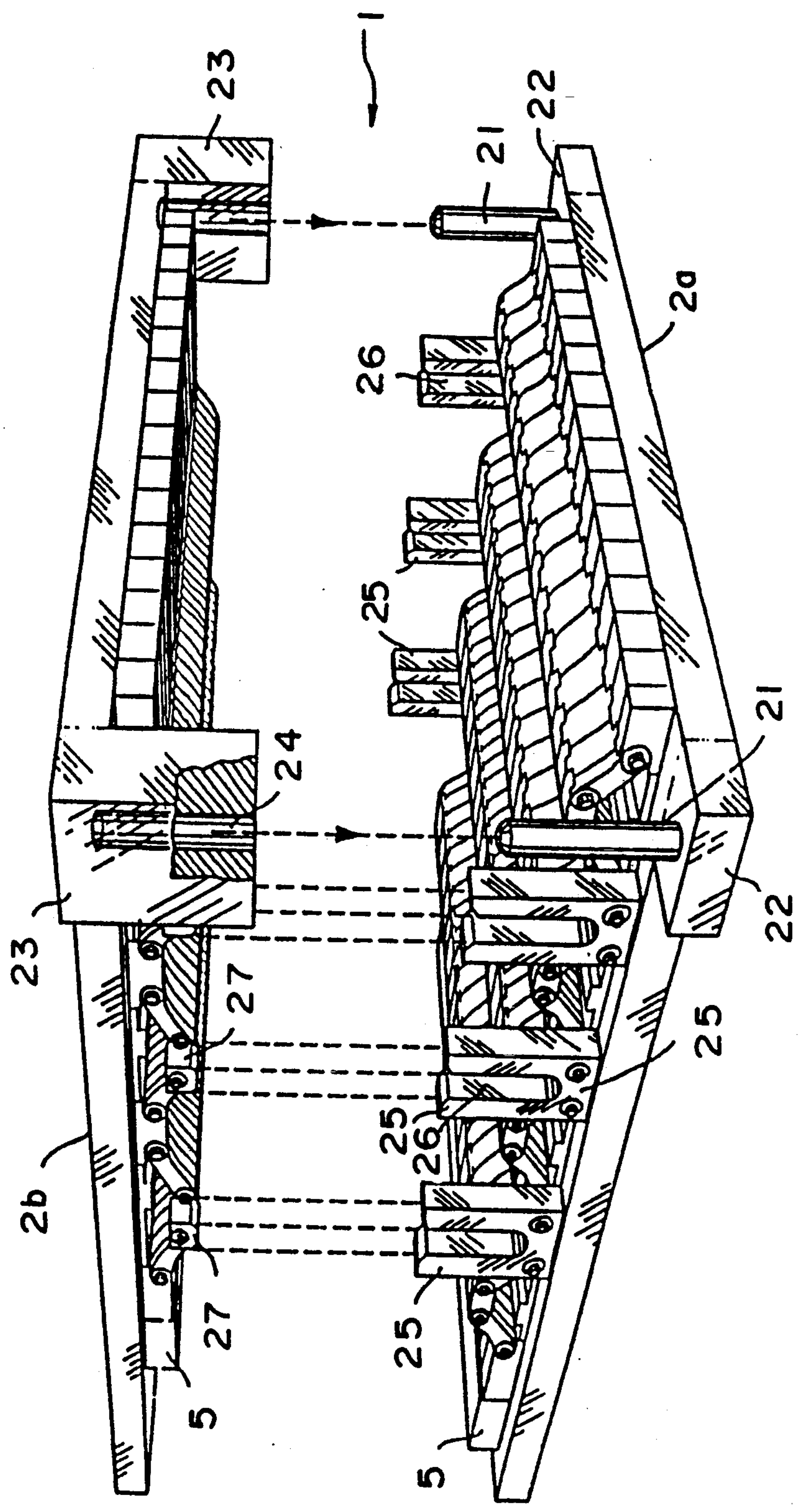
FIG. 21 is a perspective view of the upper and lower platens illustrating their respective alignment members.

Having reference in particular to FIG. 21 there is provided means for aligning the lower and upper platens 2a and 2b respectively one with another. More specifically, a pin 21 is mounted on block 22 of the lower platen 2a. An upper block 23 having a female bore 24 in registration with pin 21 is mounted thereabove an upper platen 2b. A plurality of U-shaped guides 25 are positioned in spaced apart relationship on the lower platen 2b. Corresponding sliders 27 adapted to conform to the U-shaped guides are mounted at spaced intervals on the upper platen 2b.

Figure 3:
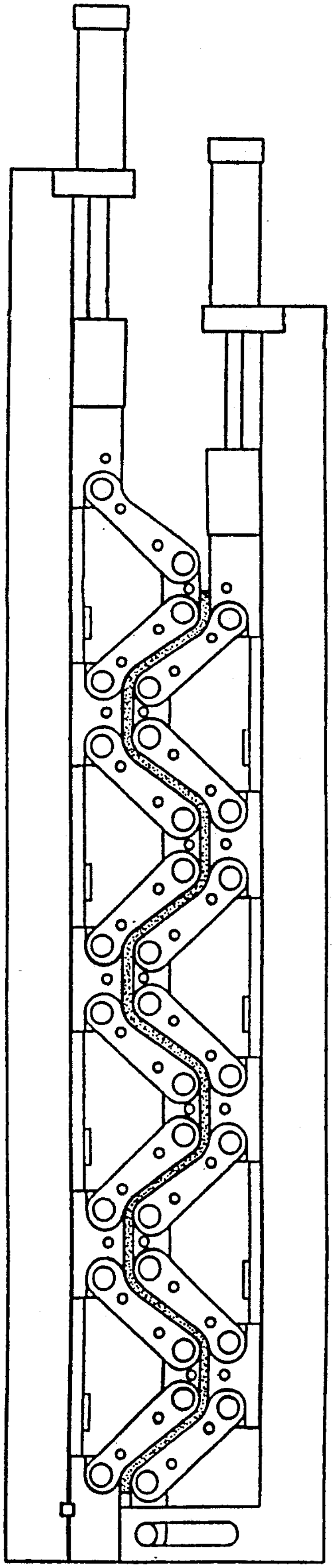
FIG. 3 is a side view illustrating the upper and lower platen assemblies in the fully corrugated mode with the wafer mat therebetween.
Figure 4:
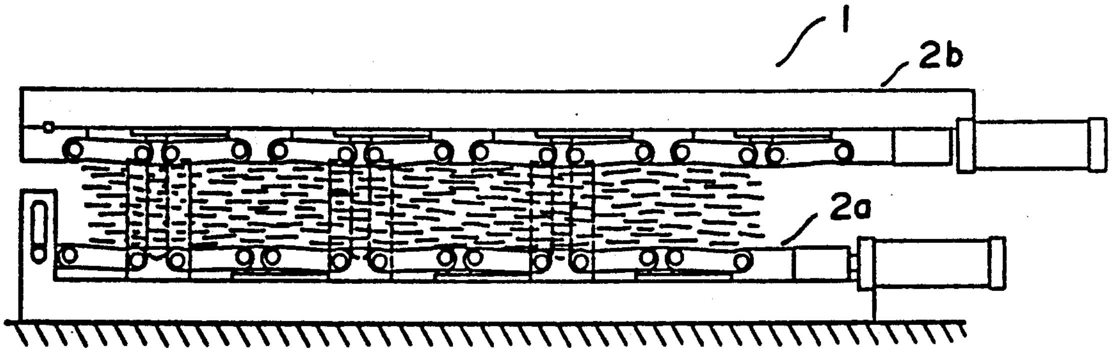
FIG. 4 is a side view showing upper and lower platens with the mat therebetween prior to compression.
Figure 5:
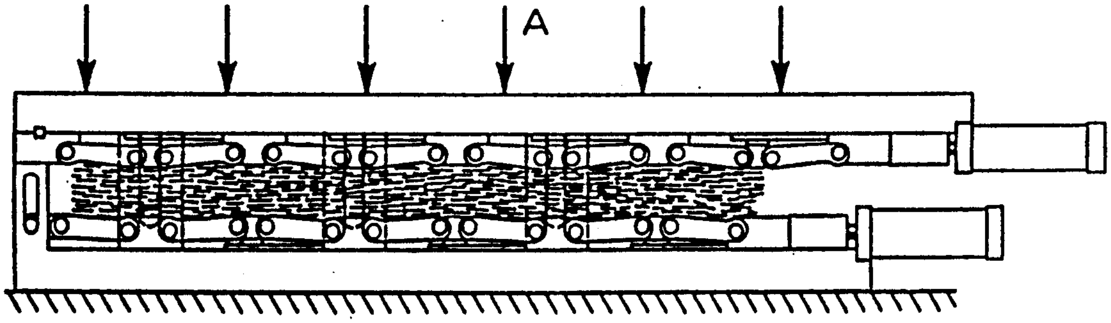
FIG. 5 is a side view showing upper and lower platens at the commencement of the compression step.
Figure 6:
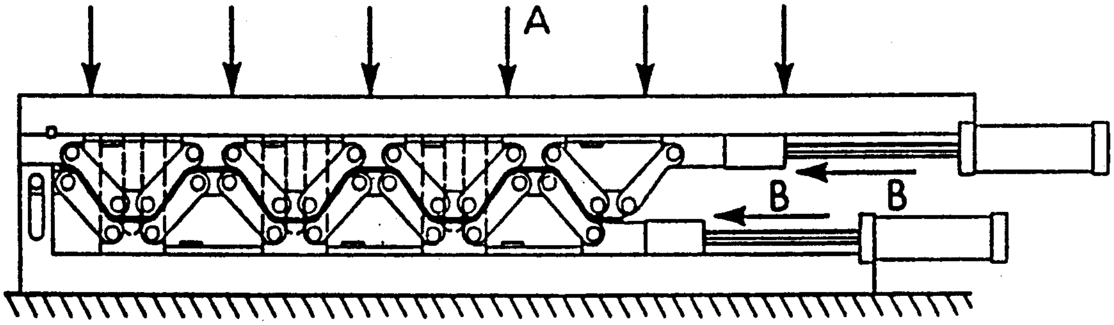
FIG. 6 is a side view showing the press assembly in the fully corrugated position.

FIG. 3 shows two horizontal platen assemblies in spaced apart opposed relationship. Conventional press members (not shown) may be connected to the platen assemblies 1, for biasing the latter together in a vertical direction and applying pressure thereto.

The process for producing the flat-topped waveboard was follows.

The furnish could be prepared using various wood species. Aspen logs, approximately 8' length and 6"-14" in diameter were used. The logs were cleaned, debarked, waferized and screened in accordance with conventional methods. The strand or wafer length ranged between 1" and 12". A preferred length would range from 4" to 8". Most preferably, the length would range from between 2" to 6". The thickness of the wafers ranged from 0.02" to 0.06". The preferred wafer thickness would be 0.03". The wafer width may range from 0.2" to 2".

The moisture content of the furnish was reduced from the green state to about 5% using commercial dryers. The wafers were screened following drying.

At 5% moisture content, the furnish was blended with between 1% to 6% by weight of a thermosetting resin and 1% by weight wax in a drum blender. Wax was utilized to improve the moisture resistance of the panel. Resin was utilized as a binder for the wafers. Preferably, the resin would comprise a powdered phenol formaldehyde resin, or alternatively an isocyanate type resin.

The wafers and wax/resin in admixture were arranged loosely by hand between two flexible stainless steel screens (cauls) to form the mat. The quantity of wafers and resin used was sufficient to produce a board having the required density. The cauls had previously been dusted with talcum powder to prevent bonding of the wafers thereto. Using the cauls the mat was transferred to the press.

In the press, the mat was subjected simultaneously to high temperature, which set the binder and to high pressure which compressed the mat to its specified thickness. The platen temperature was maintained at 205° C.

The press members were actuated to force the flat platen assemblies 1 toward one another, pre-compressing the mat thereby substantially fixing the wafers together and restricting their relative movement. The vertical pre-compression force applied was of the order of $10^5$ Newtons. At this displacement, the cylinders 6 were actuated to cause the biasing members 5 of the two platen assemblies 1 to move toward the stop members 4. The magnitude of the applied laterally-directed force was of the order of $10^5$ Newtons.

A final compression was applied by bringing the press platens closer together until the latter reached their stops. The panel was retained between the press platens for four minutes to permit the resin to set.

Prior to removal of the finished wave-panel from the press, the pressure was released slowly to avoid steam release damage.

The panels were then cooled. The panel depth from peak to peak bottom may range from between 2" to 6". The thickness of the panel would range from 0.25" to 0.75".

EXPERIMENTAL

The following table provides a comparison of the panel properties of flat-topped corrugated waferboard, sinusoidal corrugated waferboard and ordinary flat (i.e. planar) waferboard.

TABLE 1

| Panel Properties | Flat top corrugated waferboard | Sinusoidal corrugated waferboard | Ordinary flat waferboard |
|---|---|---|---|
| Panel density (kg/m$^3$) | 681 | 647 | 665 |
| Unit panel mass (kg/m$^2$) | 9.2 | 8.6 | 7.7 |
| Wavelength (mm) | 310 | 188 | — |
| Panel depth (mm) | 104 | 65 | 11.6 |
| Skin thickness (mm) | 10.4 | 11.2 | 11.6 |
| MC (%) | approx. 4% | 4.1 | 3.6 |
| Unit max. moment (Nmm/mm) Bending strength | 4624 | 4000 | 587 |
| Unit El (Nmm$^2$/mm) Bending stiffness | 50,300,000 | 20,400,000 | 724,000 |

The embodiments in which an exclusive property or privilege are claimed are defined by the claims which now follow:

1. A wave-board panel which comprises a panel formed of a mat of thermosetting resin and wax admixed with wafers having a length ranging from about 1" to 12", a thickness ranging from 0.02" to 0.06", width ranging from 0.2" to 2", and a resin content ranging from about 1% to about 6% wherein said mat has been converted from a planar to a wave configuration and subjected to binder curing and compression, said board having a flat-peaked and a flat-troughed profile, a panel depth of 2" to 6", a panel thickness of 0.25" to 0.75", said panel further having an essentially uniform density throughout, and a significantly improved Unit El bending stiffness over a sinusoidal or flat wafer board panel.

2. The wave-board panel as set forth in claim 1 wherein said wafer length ranges between 4" and 8".

3. The wave-board panel as set forth in claim 1 wherein said wafer length ranges from 2" to 6".

4. The wave-board panel as set forth in claim 3 wherein said wafer thickness is about 0.03".

5. The wave-board panel as set forth in claim 1 wherein said resin comprises phenol formaldehyde.

6. The wave-board panel as set forth in claim 4 wherein said resin comprises phenol formaldehyde.

7. The wave-board panel as set forth in claim 1 wherein said resin comprises isocyanate resin.

8. The wave-board panel as set forth in claim 4 wherein said resin comprises isocyanate resin.

* * * * *